Patented Dec. 3, 1940

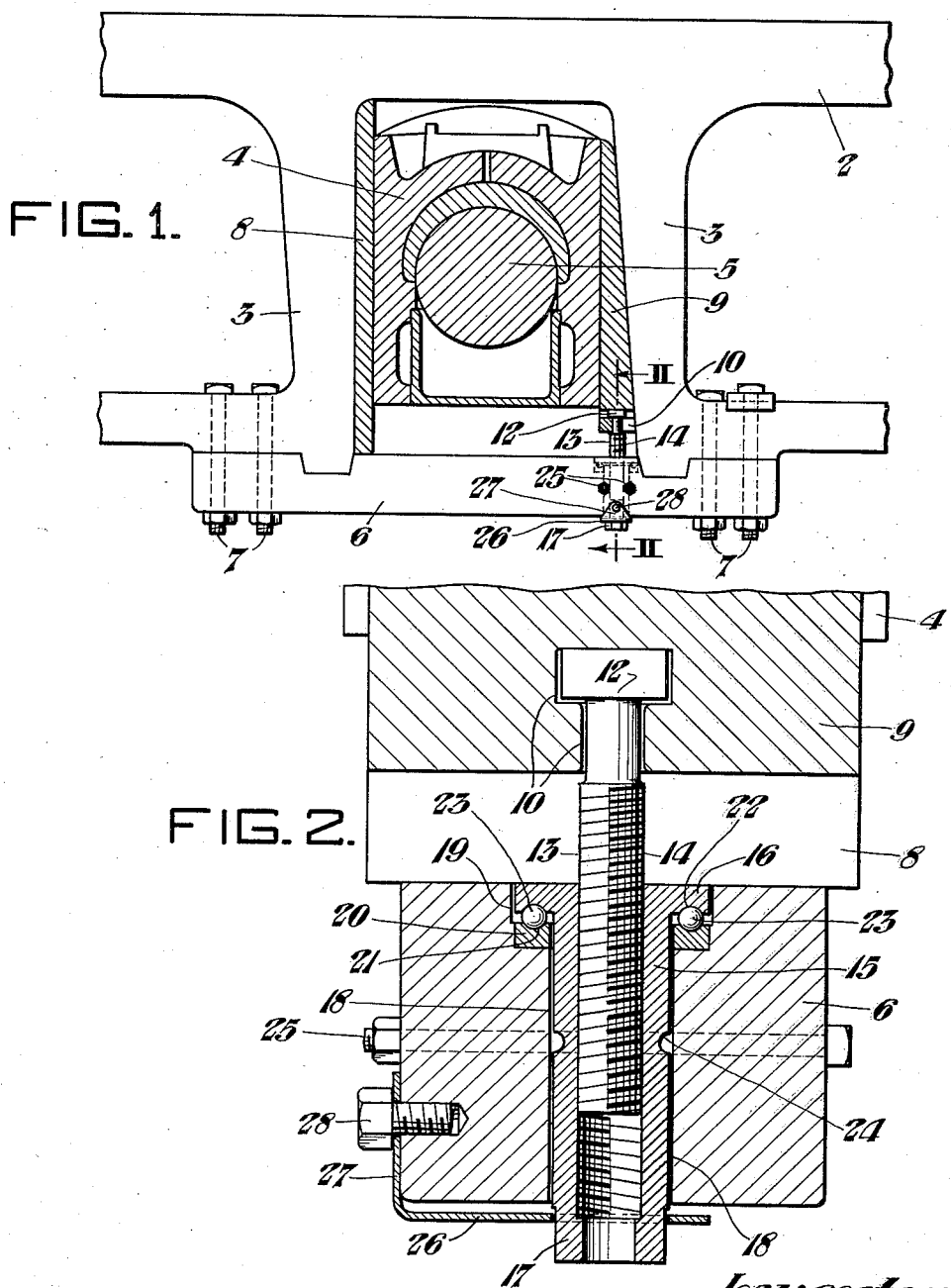

2,224,065

UNITED STATES PATENT OFFICE 2,224,065

MEANS FOR ADJUSTING LOCOMOTIVE BEARINGS AND THE LIKE

George W. Shriver, Youngstown, Ohio

Application January 3, 1939, Serial No. 249,084

3 Claims. (Cl. 308—66)

This invention relates to a means for adjusting bearings and, particularly, to an improved means for adjusting locomotive journal boxes or bearings and the like.

In locomotives, usually the drive shaft thereof is journaled in boxes or bearings arranged in the side frames of the locomotive. These journal boxes or bearings usually are provided with side wearing metallic shoes or shims which are adapted to maintain the bearings or boxes in correct position in the frame and are provided so as to adjust the same due to the wear caused by the thrust and vertical motion of the journal. One of these shoes is usually a straight shoe having an even thickness positioned on one side of the bearing and the other is a shoe of the tapered wedge type which is adapted to be adjusted vertically to compensate for this wear.

Heretofore, the adjustment of this wedge usually was accomplished by means of an adjustment screw arranged opposite the end of the wedge in the bottom strap member of the side frame with the end of the screw bearing against or being engaged with the end of the wedge, in order to properly move the same vertically. In order to move the wedge vertically for various adjustments thereof, it was necessary that this adjustment screw be relatively long. Consequently, the adjustment screw extended a considerable distance below the bottom strap member, which was very undesirable and unsatisfactory in that this extension would frequently become accidentally bent or broken, thus necessitating repair and, generally, the replacement thereof, which was expensive and inconvenient for the use of the engine was lost during such maintenance.

According to the present invention, there is provided an adjusting means for such wedges which will protrude a minimum distance beyond the bottom strap member, thereby eliminating any danger of it becoming accidentally damaged or broken.

It is one of the objects of the present invention to provide an improved means for adjusting the bearings of locomotives and the like which is simple and inexpensive in its construction and one that can be easily maintained and repaired.

It is another object of this invention to provide an improved means for adjusting the bearings of locomotives and the like which is rugged in its construction and yet one with which the adjustment can be quickly and conveniently made.

It is a further object of the invention to provide an improved means, including a wedge adjustment jack bolt, for adjusting the bearings of locomotives and the like in which the outer end of the jack bolt is completely housed and protected.

Various other objects and advantages of this invention will be more apparent in the course of the following specification and will be particularly pointed out in the appended claims.

In the accompanying drawing there is shown, for the purpose of illustration, one embodiment which my invention may assume in practice.

In this drawing:

Figure 1 is a cross section of the improved means for adjusting the jack bolt and wedge of my invention showing it incorporated with the side frame of a locomotive; and, Figure 2 is an enlarged section taken on line II—II of Figure 1.

Referring more particularly to the drawing, there is shown a side frame or pedestal 2 of a locomotive having downwardly extending legs or arms 3 for receiving a bearing 4 therebetween in which the end of a drive shaft 5 is adapted to be journaled. There is arranged across the bottom of the arms 3 a bottom strap member 6 attached to the frame by means of bolts 7.

According to the present invention, there is arranged, on one side of the bearing, a flat shoe or shim 8 of an even thickness and, on the other side, a wedge shoe or shim 9 which is adapted to be moved inwardly between the bearings 4 and the arms 3 in order to compensate for the wear on the bearing due to the thrust and vertical motion of the journal therein. There is arranged, in the lower wide end of the wedge 9, a T-slot 10 which is adapted to receive the square head 12 of one end of a threaded screw or stud member 13 or, as it is commonly called, jack bolt, having a threaded portion 14 on the outer or lower end thereof. There is arranged on the threaded portion 14 of the screw 13, a cylindrical sleeve 15 having a flanged portion 16 arranged on the upper end thereof and preferably a hexagonal portion 17 on the lower end thereof, or any other suitable shaped portion, to which a wrench or other actuating means can be attached for the turning thereof.

The sleeve 15 is rotatably mounted preferably in a cylindrical opening 18 suitably arranged in and through the bottom strap member 6. The upper part of the opening 18 has preferably a counterbore 19 in which there is arranged preferably an annular bearing or ring member 20, having a ball raceway 21 arranged on the upper surface thereof. The lower surface of the flange 16 of the sleeve 15 has arranged therein a similar raceway 22 which is adapted to be disposed oppositely from the raceway 21 in the bearing ring 20. There is disposed between these two raceways 22 and 21 ball bearings 23 which are adapted to act as a bearing for the sleeve 15 in its rotatable movement. It will be understood that any other suitable bearing means may be provided in the counterbore 19.

The sleeve 15 has arranged around its periphery, intermediate its ends, preferably an annular or circumferential groove 24 which is adapted to cooperate with a pair of bolts 25 arranged through the strap member 6 for the purpose of retaining the sleeve in the opening 18 but permitting rotation thereof. The hexagonal portion 17 of the sleeve 15 is adapted to extend below the bottom surface of the strap 6 and there is arranged therearound preferably an angular member 26, for the purpose of keeping the sleeve 15 in position and to prevent any unintentional rotatable movement thereof. This angular member 26 has preferably an upwardly extending portion 27 with preferably a cylindrical opening therein through which a cap screw 28 is adapted to be inserted to cooperate with a threaded apertured hole in the side of the strap plate 6 for holding the member 26 in position thereon.

In order to advance or retract the position of the wedge 9 to adjust the bearing 4 between the arms 3, that is, to eliminate any lost motion or any clearance therebetween, the cap screw 28 is removed from the side of the strap member 6 and the angular locking member 26 removed from the hexagonal portion 17 of the sleeve 15. A wrench or other suitable tool is then placed on the hexagonal portion 17 and the sleeve 15 turned in the proper position to raise or lower the wedge as desired. After the adjustment is made, the angular plate 26 is again positioned over the hexagonal portion of the sleeve and the cap screw 28 screwed into position into the strap member so as to hold the same thereon in order to keep the sleeve 15, together with the jack bolt 13, in its adjusted position and to prevent any accidental or unintentional turning thereof.

As a result of this invention, it will be seen that the outer threaded portion 14 of the jack bolt 13 is completely housed and that it, at no time, extends below the bottom surface of the strap member 6 and the only part of the assembly that does extend below the strap 6 is the hexagonal portion 17 of the strap 15 and this just sufficiently enough to enable the gripping thereof with a wrench or other actuating tool. In such a construction, the distance that the part of the assembly extends below the strap 6, that is, the hexagonal portion 17 of the sleeve 15, is always the same and does not vary with the different adjustments on the wedge 9. It will be seen that, by eliminating an excessive portion of the wedge adjustment jack bolt assembly from extending below the bottom strap, any danger of it becoming damaged or broken is entirely eliminated. The improved bearing adjusting means of my invention is shown incorporated with the bearing of a locomotive but it will be understood that it can be incorporated and used for adjusting any similar bearings or journal boxes.

While I have shown and described one embodiment of my invention, it will be understood that this embodiment is merely for the purpose of illustration and description and that various other forms may be devised within the scope of my invention, as defined in the appended claims.

I claim:

1. An adjustable means for positioning the bearings of locomotives and the like comprising, in combination, a wedge member arranged along the side of the bearing, a fixed strap member arranged opposite the large end of said wedge and said bearing, said strap member having a cylindrical hole arranged therethrough with a counter-bored portion arranged in said strap member at the inner side of said hole, a rotatable cylindrical sleeve member positioned in the hole in said strap member, said sleeve member being interiorly threaded and having a flange portion arranged on the inner end thereof which is disposed in the counter-bored portion of said hole, bearing means arranged in the counter-bored portion of the hole between the inner wall thereof and the flange portion of said sleeve member, means for retaining the sleeve member in the hole in said strap member so as to prevent endwise movement of the sleeve but to permit rotation thereof, a threaded screw member having the inner end thereof attached to the large end of said wedge member and with the threaded portion thereof disposed in said sleeve so as to cooperate with the interiorly threaded portion thereof by which it is adapted to be moved to adjust the wedge member, and a locking bracket member removably attached to the outer side of said strap member so as to engage directly with the outer end of said sleeve member to prevent unintentional rotation thereof.

2. An adjustable means for positioning the bearings of locomotives and the like as defined in claim 1 wherein the means for retaining the cylindrical sleeve member in the hole in the strap member consists of a pair of bolts extending through the strap member with one disposed on each side of the sleeve substantially in the same plane and parallel to each other and which cooperate with a circumferential groove arranged around the periphery of said sleeve member intermediate the length thereof to prevent endwise movement of the same therein and to permit rotation thereof.

3. An adjustable means of the class described comprising, in combination, a wedge member arranged along the side of the bearing, a fixed strap member arranged opposite the large end of said wedge and said bearing, said strap member having a cylindrical hole arranged therethrough with a counter-bored portion arranged at the inner side of said hole, an interiorly threaded cylindrical sleeve member rotatably arranged in the hole in said strap member having an adjustable tool engagement portion arranged on the outer end thereof and extending a slight distance beyond the strap member, said sleeve member having a flange portion arranged on the opposite inner end thereof which is disposed in the counter-bored portion of said hole and a circumferential groove arranged therearound intermediate the length thereof, roller bearing means for said sleeve arranged in the counter-bored portion of the hole in said strap member between the inner wall thereof and the flange portion of said sleeve member, at least one bolt arranged in said strap member cooperating with the circumferential groove arranged around said sleeve member so as to retain the same in the hole in said strap member and to prevent endwise movement of the same therein, a threaded stud member having the inner end thereof removably attached to the large end of said wedge member with the opposite threaded end portion thereof disposed within said sleeve so as to cooperate with the interiorly threaded portion thereof by which it is adapted to be moved so as to adjust the position of the wedge, and a locking bracket member removably attached to said strap member on the outer side thereof, said strap member adapted to engage with the adjusting tool engagement portion on the outer end of said sleeve member so as to prevent unintentional rotation thereof.

GEORGE W. SHRIVER.